July 21, 1936.   LE ROY S. DUNHAM   2,048,375
MAGNETO-ELECTRIC GENERATOR
Filed July 6, 1935
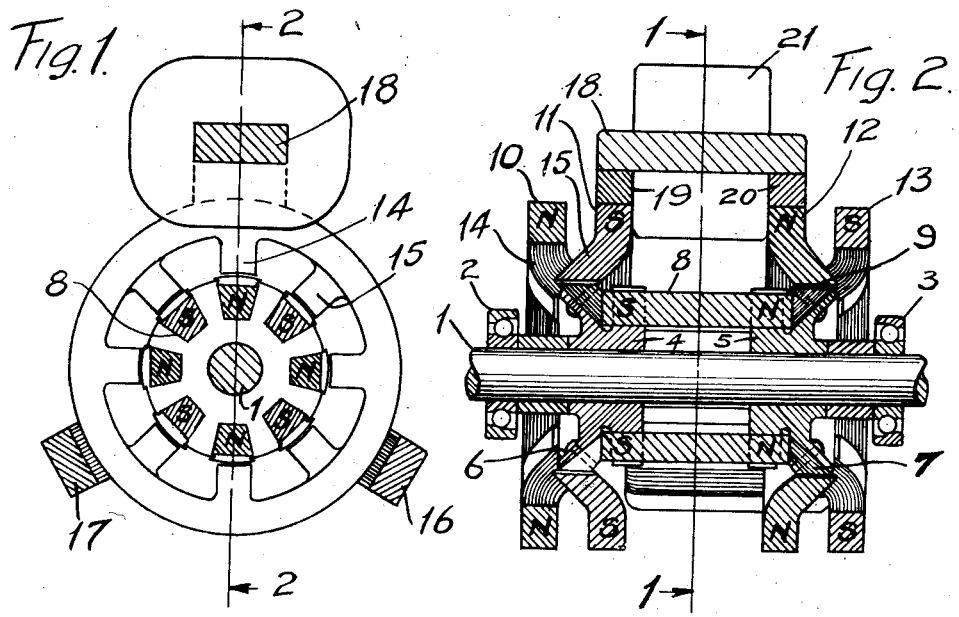
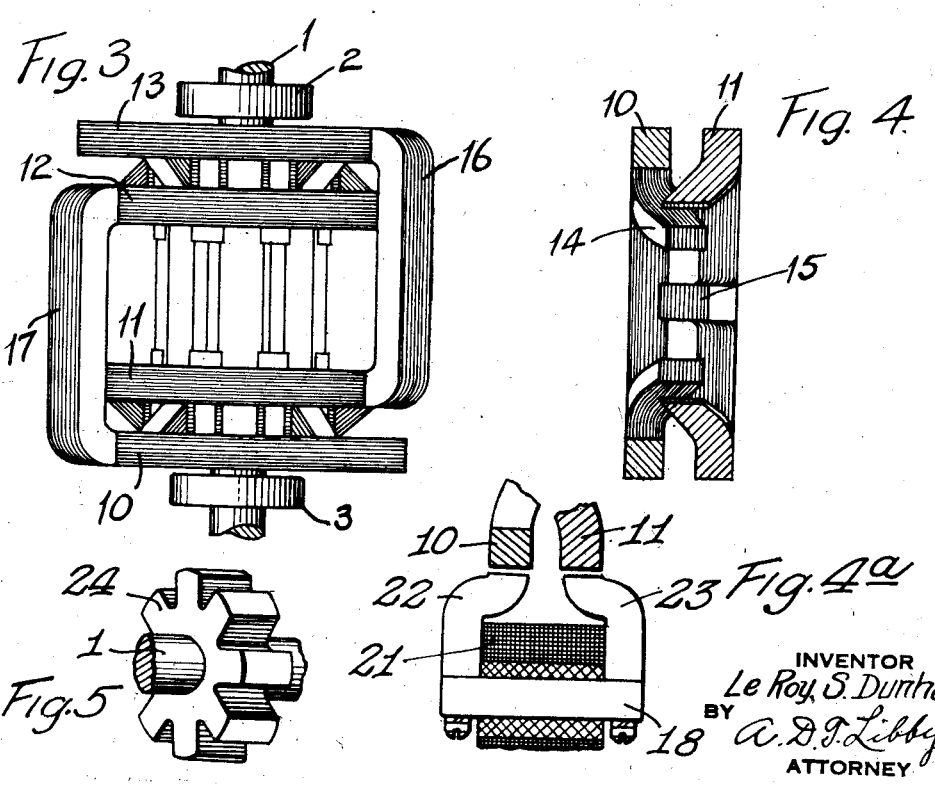
INVENTOR
Le Roy S. Dunham.
BY
A. D. J. Libby
ATTORNEY Patented July 21, 1936

2,048,375

UNITED STATES PATENT OFFICE 2,048,375

MAGNETO-ELECTRIC GENERATOR

Le Roy S. Dunham, East Orange, N. J., assignor to Edison-Splitdorf Corporation, West Orange, N. J., a corporation of New Jersey Application July 6, 1935, Serial No. 30,098

6 Claims. (Cl. 171—252)

This invention relates to an electric generator of the magneto type, such as used to furnish ignition current for internal combustion engines.

The object of the invention is to provide a magneto in which the source of magnetic flux for the induction coil is provided by a rotating magnet or magnets, such a structure utilizing a smaller amount of magnet steel than is used in the ordinary type of machine having relatively large external bar or horseshoe magnets.

My invention will be readily understood by one skilled in the design of magnetos, by reference to the annexed drawing, wherein:

Figure 1 is a more or less diagrammatic view on the line 1—1 of Figure 2.

Figure 2 is a sectional view on the line 2—2 of Figure 1.

Figure 3 is a skeleton view of the stator and rotor structure utilized in the machine.

Figure 4 is a view from the interior of the machine looking at one pair of the flux collector rings utilized in the magneto.

Figure 4a shows a modified form of construction, only part of the coil being shown.

Figure 5 is a perspective view of a form of rotor used with the structure shown in Figure 4, when used with the coil and pole pieces of Figure 4a.

In the various views, wherein like numbers refer to corresponding parts, 1 is a shaft supported on bearings 2 and 3. Securely carried on the shaft 1, is a pair of spiders 4 and 5, each having a plurality of slots within which are positioned bar magnets arranged so as to give alternate polarity at each spider end; that is to say, the end of one bar in one spider may be a north pole, while the next adjacent bar end presents a south pole. Preferably, each spider is provided with a plurality of projecting arms 6 to which there are rigidly mounted magnetic pole pieces 7. These pole pieces 7 are preferably of laminated material so as to distribute the flux coming from the bar magnets in an efficient manner. As will be seen by the various figures, the magnets 8 are circumferentially arranged in longitudinally spaced arrangement around the shaft 1, and the pole pieces 7 terminate in polar faces 9 which are also preferably parallel with the axis of the shaft 1.

Carried at opposite ends of the frame of the magneto, adjacent the spiders 4 and 5 (the frame is omitted for the purpose of clarity), are pairs of flux collector rings 10 and 11, and 12 and 13, all preferably constructed of laminated sheets, the pair of rings 10 and 11 being in spaced relation adjacent the spider 4, while the pair of rings 12 and 13 are in spaced relation adjacent the spider 5. Each of the collector rings 10 and 12 is provided with a plurality of polar projections 14, while the collector rings 11 and 13 are provided with the same number of similar polar projections 15. The polar projections on the pair of rings 10 and 11, as well as on the rings 12 and 13, are arranged alternately in spaced relation and extend into cooperative position with the polar faces 9 of the pole pieces 7 of the bar magnets 8.

Thus it will be seen from the various figures, that in one position of the rotor, the collector ring 10 will be magnetized for one polarity; for example, north; while the ring 11 will be magnetized for the opposite polarity or south. In addition, the ring 12 will be magnetized to correspond to the ring 10, and the ring 13 to correspond to the ring 11, these collector rings alternating in polarity as the rotor is turned.

In order to utilize all of the poles simultaneously to get the greatest efficiency from the machine, I provide a bridge member 16 of laminated stock of good magnetic material which connects the rings 11 and 13 magnetically together; likewise, a similar bridge 17 which connects the flux collector rings 10 and 12 together.

Contacting with one pair of the rings of opposite magnetic polarity; for example, the rings 11 and 12, I provide a core 18 having extensions 19 and 20 which engage the rings 11 and 12. The core 18 carries an induction coil 21 having the usual primary and secondary windings.

From the construction above described, it will be seen that the structure will produce as many electrical impulses as there are bar magnets on the rotor. While the bar magnets 8 may be formed directly into the polar surface 9, I prefer to use the separate pole pieces as shown, forcing the bars 8 into position between them on the spiders.

It is within the scope of my invention to utilize with the stator shown, a rotor 24, as shown in Figure 5, in which the magnet has its lines of polarization at right angles to the axis of rotation on the shaft, so that alternate polar surfaces in their entirety are exposed to the magnetic cooperation with a pair of the collectors. With such a rotor, only one pair of the collector rings such as 10 and 11 shown in Figure 4 is required and the core 18 of the induction coil 21 would bridge this pair of collector rings as shown by the arms 22 and 23 extending from the core 18 in Figure 4a.

Other changes in the mechanical details may be made without departing from the spirit of my invention or the scope of the appended claims.

What I claim is:

1. A magneto-electric generator including a shaft carrying a pair of spaced spiders, bar magnets supported between said spiders, the bars being arranged to give alternate polarity at each spider end and the bar ends terminating in polar faces, a pair of spaced flux collector rings having polar projections to cooperate with the magnet poles adjacent each of said spiders, bridge members of magnetic material connecting the flux collector rings of like polarity and a core carrying an induction coil bridging a pair of the flux collector rings of opposite polarity.

2. A magneto-electric generator comprising rotor and stator structures, the rotor including a shaft and a plurality of bar magnets circumferentially arranged in spaced longitudinal relation around the shaft and terminating at opposite ends in polar faces; the stator including a pair of spaced flux collector rings at opposite ends of the rotor, each pair of rings having polar projections extending in alternate relationship into cooperative position with said rotor polar faces, bridge members of magnetic material connecting the flux collector rings of like polarity and a core carrying an induction coil bridging a pair of the flux collector rings of opposite polarity.

3. A magneto-electric generator comprising rotor and stator structures, the rotor including a shaft and a plurality of bar magnets arranged in a cage-like formation around the shaft and terminating at each end in polar faces; the stator including a pair of spaced flux collector rings at opposite ends of the rotor cage, each pair of collector rings having polar projections extending toward a common plane between the two rings and into alternate spaced relationship with their ends in cooperative position with the rotor polar faces, bridge members of magnetic material connecting the flux collector rings of like polarity and a core carrying an induction coil bridging a pair of the flux collector rings of opposite polarity.

4. A magneto-electric generator as defined in claim 3, further characterized in that the bar magnets are wedged between separate pole pieces terminating in polar faces which are parallel to the axis of the shaft.

5. A magneto-electric generator as defined in claim 3, further characterized in that the bar magnet polar faces have substantially all parts thereof equi-distant from the axis of the shaft.

6. A magneto-electric generator comprising rotor and stator structures, the stator including at least a pair of spaced ring members of laminated material having pole pieces substantially the width of said rings and projecting generally radially therefrom toward the rotor in intermeshing relation, a laminated core connecting said ring members and an induction coil on said core, said rotor comprising a structure terminating in a plurality of pairs of arcuately spaced permanently magnetized poles of alternate polarity for cooperation with the inwardly projecting pole pieces from each of said rings.

LE ROY S. DUNHAM.